C. F. FLEMMING.
MANUFACTURING OF SPONGE RUBBER PLAYING BALLS.
APPLICATION FILED NOV. 15, 1920.

1,370,805.

Patented Mar. 8, 1921.

Inventor:
Charles F. Flemming
by Spear Middleton Donaldson & Hall
Atty's.

UNITED STATES PATENT OFFICE.

CHARLES F. FLEMMING, OF AKRON, OHIO, ASSIGNOR TO THE MILLER RUBBER COMPANY, OF AKRON, OHIO, A CORPORATION OF OHIO.

MANUFACTURING OF SPONGE-RUBBER PLAYING-BALLS.

1,370,805.     Specification of Letters Patent.     Patented Mar. 8, 1921.

Application filed November 15, 1920. Serial No. 424,156.

*To all whom it may concern:*

Be it known that I, CHARLES F. FLEMMING, a citizen of the United States, and resident of Akron, in the county of Summit and State of Ohio, have invented certain new and useful Improvements in the Manufacturing of Sponge-Rubber Playing-Balls, of which the following is a specification.

My present invention relates to a method of manufacturing sponge rubber articles which will produce a more homogeneous structure than is obtained in the practice now followed and also to the article resulting from the practice of one form of my invention.

Sponge rubber articles such as playing balls have heretofore been made by placing within the cavity of a suitably vented mold a quantity of sponge rubber compound less than the capacity of the mold cavity and in contact with or in juxtaposition to the bottom of the cavity only and as the heat applied to the mold will not travel readily across the air space between the stock and the wall of the cavity it results that the stock is not uniformly heated; the lower portion of the blank for instance receiving the most heat at first and those parts which are nearer the wall receiving more heat than those that are farther away. This non-uniform heating produces an article with a non-uniform distribution of air cells and with parts unequally vulcanized.

My method aims to avoid these objections in the manner which will now be described in detail, by the aid of the accompanying drawing illustrating a mold suitable for use in carrying out the process.

Figure 1:
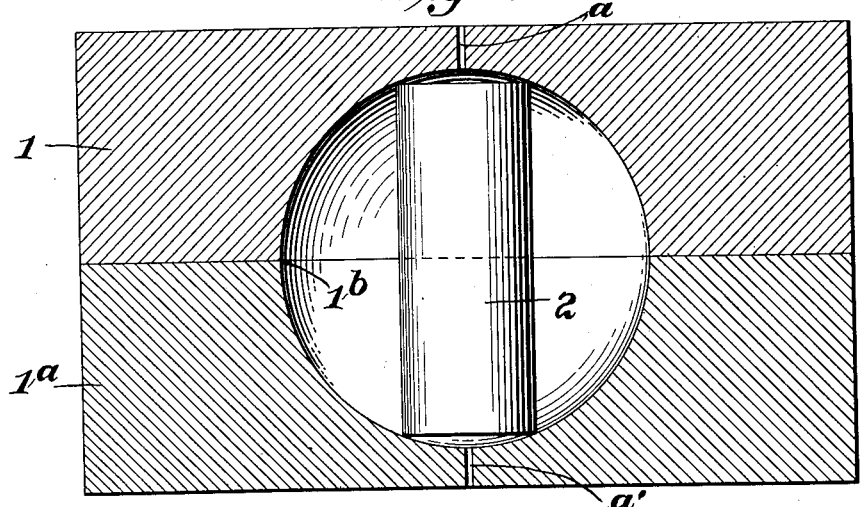

In this drawing Figure 1 is a transverse vertical sectional view of a two part mold having a spherical mold cavity with a blank therein.

Figure 2:
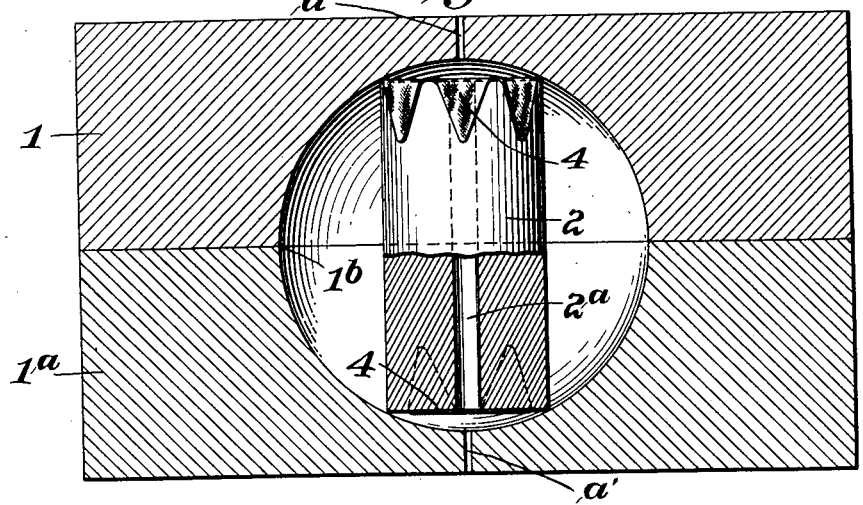

Fig. 2 is a perspective view of a modified form of blank; and

Figure 3:
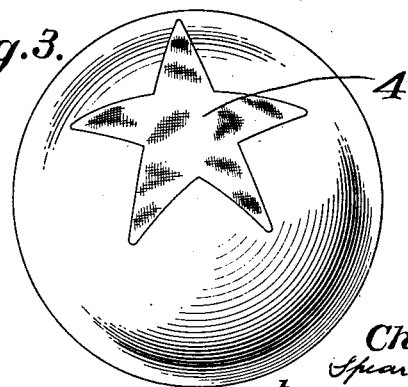

Fig. 3 a view of a finished ball.

Referring by reference characters to this drawing the numerals 1 and 1ᵃ designate the two sections of a mold designed to be heated in the ordinary or any desired manner, which is customarily done by placing the closed mold in a platen press which holds the sections together during the vulcanizing and imparts the necessary heat thereto. The mold sections are provided with air vents as indicated at $a$ and $a'$.

Within the mold cavity I place a blank of rubber compound having incorporated therein the blowing medium, which blank is indicated at 2, and which, according to my invention, I make of elongated form so that when it is placed in the lower mold half above the vent opening and the mold closed the upper end of the blank will be in close proximity to or in contact with the top of the mold cavity as shown. It will be understood that the blank is so proportioned that not only does it extend substantially the full height of the mold cavity, but its volume is such that when the vulcanizing heat is applied it will swell to fill the mold cavity and thereby be forced into spherical or ball shape. Due to the shape and position of the blank it is heated equally from both ends. The vents allow the small amount of air entrapped at the ends of the blank to escape, and as the blank swells laterally the remaining air, or that surrounding the sides of the blank, escapes through the parting or division line of the mold indicated at $1^b$.

I find it advantageous to form the blanks by extruding the material in cylindrical form from a tubing machine, the pressure of which with its smoothing or friction action tends to close the pores of the rubber compound and produce an extremely smooth exterior surface. The material coming from the tubing machine is severed into the desired lengths by a knife or cutter coated with a material such as alcohol which has the effect of closing the pores in the ends of the blanks.

I have found that the quicker the blank in swelling comes in contact with the wall of the mold cavity the better the resulting article, and to secure this I form the blank in the shape of a tube or cylinder with a central longitudinal passage $2^a$ which for a given amount of material brings the exterior side wall of the cylinder closer to the wall of the mold cavity, so that it does not have to swell so far to contact therewith. This causes a much more uniform heating of the blank and a resulting article in which the pores are more evenly distributed throughout the ball and further tends to avoid the formation of pits in the periphery of the ball.

I have also found that the results can be still further improved by placing over the ends of the blank a disk or layer of cloth, or similar fibrous or porous material, which, where the blank is of tubular form or provided with a central passage, would be disposed so as to cover the end openings.

Such disks or layers, being porous, allow the passage of air from the hollow center of the blank and also permit air from the side spaces to follow the threads or fibers of the cloth and thereby facilitate its escape from the mold. These disks or layers may be made in ornamental forms and colors, as for instance in the shape of a star of any desired color, as indicated at 4, which, being firmly united with the surface of the ball and embedded therein in the vulcanizing action will produce an ornamental design at each end of the ball.

Further, the presence of the cloth disk will prevent the rubber composition being forced into the perforations of the mold.

Having thus described my invention what I claim is:

1. The herein described method of making sponge rubber articles which consists in placing within a vented mold cavity an elongated blank of sponge rubber compound with its ends disposed in contact with opposite walls of the cavity, and thereafter subjecting the same to vulcanizing heat.

2. The herein described method of making sponge rubber balls which comprises placing within a spherical mold cavity a cylindrical block of unvulcanized sponge rubber material, and thereafter subjecting the mold to heat to cause the material to expand to fill the mold and effect vulcanization.

3. The herein described method of making sponge rubber articles which comprises placing within a mold cavity a block of unvulcanized sponge rubber material of a length substantially equal to the height of the mold cavity and of a diameter considerably less than the width of a cavity, and thereafter subjecting the mold to heat to cause the material to expand to fill the mold and effect vulcanization.

4. The herein described method of making sponge rubber articles which comprises placing within a mold having a vented mold cavity a block of unvulcanized sponge rubber having a passage through the center in substantial alinement with the mold vent, and thereafter applying vulcanizing heat to said mold.

5. The herein described method of making sponge rubber balls which consists in extruding a vulcanizing compound containing a blowing agent from an extruding machine to form a smooth exterior wall cutting the resulting article into sections of determined length, placing such sections in mold cavities, and subjecting them to vulcanizing heat.

6. The herein described method of making sponge rubber balls which consists in extruding a vulcanizing compound containing a blowing agent from an extruding machine to form a smooth exterior wall, cutting the resulting article into sections of determined length by a cutting instrument coated with a fluid acting to close any cells in the ends exposed by severing, placing such sections in mold cavities, and subjecting them to vulcanizing heat.

7. The herein described method of making sponge rubber articles which consists in placing within a vented mold a block of sponge rubber compound having a passage therethrough with the ends of the passage covered with textile material, and thereafter vulcanizing the article.

8. The herein described method of making sponge rubber articles which consists in placing within a mold cavity having oppositely disposed vents a block of sponge rubber material with the central passage in communication with said vents, and thereafter subjecting such block to vulcanizing heat.

9. The herein described method of making sponge rubber balls which consists in placing within a spherical mold cavity having oppositely disposed vents a tubular block of sponge rubber material having a central passage with its ends covered by a porous material, and with said central passage in substantial alinement with said vents, and thereafter vulcanizing the article.

10. The herein described method of making sponge rubber balls which consists in placing within a spherical vented mold a block of sponge rubber material having a disk or layer of porous material on its surface in alinement with the vent and thereafter subjecting the same to vulcanizing temperature.

11. The described method of making a sponge rubber article which consists in providing a mold having a cavity of the form of the article to be made, placing within the mold cavity a blank of stock of such size as to have opposite portions in close juxtaposition or in contact with the wall of the mold cavity and other portions of the stock spaced apart from said wall, subjecting the mold to the requisite heat, and then removing the cured article from the mold.

In testimony whereof I affix my signature.

CHARLES F. FLEMMING.